United States Patent
Rentfrow et al.

(10) Patent No.: US 12,273,011 B2
(45) Date of Patent: Apr. 8, 2025

(54) ELECTRIC MOTOR SHAFT INCLUDING INNER HELIX PATTERN

(71) Applicant: Schaeffler Technologies AG & Co. KG, Herzogenaurach (DE)

(72) Inventors: Peter Rentfrow, Doylestown, OH (US); Eric Ubelhart, Orrville, OH (US); Charles Clark, Clinton, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 156 days.

(21) Appl. No.: 18/106,459

(22) Filed: Feb. 6, 2023

(65) Prior Publication Data
US 2024/0266908 A1  Aug. 8, 2024

(51) Int. Cl.
*H02K 7/00* (2006.01)
*H02K 9/19* (2006.01)

(52) U.S. Cl.
CPC ............... *H02K 7/003* (2013.01); *H02K 9/19* (2013.01)

(58) Field of Classification Search
CPC ............. H02K 7/003; H02K 9/19; H02K 1/32
See application file for complete search history.

(56) References Cited

U.S. PATENT DOCUMENTS

| 2015/0207388 A1* | 7/2015 | Sugimoto | H02K 5/203 310/54 |
| 2015/0288255 A1* | 10/2015 | Barker | H02K 1/2781 310/43 |
| 2016/0047395 A1* | 2/2016 | Zhang | H02K 5/203 417/423.14 |

* cited by examiner

*Primary Examiner* — Mohamad A Musleh
(74) *Attorney, Agent, or Firm* — Davidson Kappel LLC

(57) ABSTRACT

An induction motor rotor shaft assembly may include an induction motor rotor shaft rotatable about a center axis, the induction motor rotor shaft including a hollow cylindrical base including an outer circumferential surface, an inner circumferential surface, a first axial end and a second axial end. The induction motor rotor shaft can include a helical structure extending about the center axis on or in the inner circumferential surface. The induction motor rotor shaft assembly may include a coolant supply for providing coolant inside of the hollow cylindrical base onto the helical structure for flow axially inside the hollow cylindrical base along the helical structure as the induction motor rotor shaft rotates about the center axis.

19 Claims, 6 Drawing Sheets

ELECTRIC MOTOR SHAFT INCLUDING INNER HELIX PATTERN

TECHNICAL FIELD

The present disclosure relates generally to induction motors, and more specifically to cooling induction motors in motor vehicles.

BACKGROUND

Induction motor rotors generate heat that is removed by coolant.

SUMMARY

An induction motor rotor shaft assembly for an induction motor is provided. The induction motor rotor shaft assembly includes an induction motor rotor shaft rotatable about a center axis, the induction motor rotor shaft including a hollow cylindrical base including an outer circumferential surface, an inner circumferential surface, a first axial end and a second axial end, the induction motor rotor shaft including helical structure extending about the center axis on or in the inner circumferential surface; and a coolant supply for providing coolant inside of the hollow cylindrical base onto the helical structure for flow axially inside the hollow cylindrical base along the helical structure as the induction motor rotor shaft rotates about the center axis.

The helical structure can be formed by a helical groove in the inner circumferential surface.

The helical structure can be formed by a helical protrusion on the inner circumferential surface.

The hollow cylindrical base can include a first axial half and a second axial half, the coolant supply providing coolant through the first axial end into the first axial half.

The helical structure can be provided solely in the first half.

The helical structure can be provided in the first half and in the second half.

The helical structure can extend along an entire length of the inner circumferential surface.

The hollow cylindrical base can include a metal shaft section defining the outer circumferential surface and an insert defining the helical structure within the metal shaft section, and the insert can be plastic.

The coolant supply can include an annular outlet through which coolant flows into the hollow cylindrical base.

An induction motor includes a stator; a rotor rotatable with respect to the stator; and the induction motor rotor shaft assembly, the rotor being non-rotatably connected to the rotor for rotating the induction motor rotor shaft about the center axis.

A method of operating the induction motor rotor shaft assembly can include feeding coolant through the coolant supply into the hollow cylindrical base and rotating the induction motor rotor shaft about the center axis to cause the helical structure to pump the coolant axially through induction motor rotor shaft away from the coolant supply.

A method of manufacturing an induction motor rotor shaft assembly for an induction motor is provided. The method includes providing an induction motor rotor shaft rotatable about a center axis and including a hollow cylindrical base including an outer circumferential surface, an inner circumferential surface, a first axial end annular surface extending radially from the inner circumferential surface to the outer circumferential surface, and a second axial end annular surface extending radially from the inner circumferential surface to the outer circumferential surface forming a helical structure extending about the center axis on or in the inner circumferential surface; and providing a coolant supply for providing coolant inside of the hollow cylindrical base onto the helical structure for flow axially inside the hollow cylindrical base along the helical structure as the induction motor rotor shaft rotates about the center axis.

The forming of the helical structures can include machining a helical groove in the inner circumferential surface.

The forming of the helical structures can include machining a helical protrusion on the inner circumferential surface.

The forming of the helical structures can include depositing a helical protrusion on the inner circumferential surface.

The hollow cylindrical base can include a first axial half and a second axial half, the coolant supply being provided through the first axial end annular surface into the first axial half, an outlet of the coolant supply being inside the first half.

The hollow cylindrical base can include a metal shaft section defining the outer circumferential surface, the forming of the helical structure including inserting an insert defining the helical structure within the metal shaft section. The insert can be plastic.

BRIEF DESCRIPTION OF THE DRAWINGS

The present disclosure is described below by reference to the following drawings, in which.

DETAILED DESCRIPTION

The present disclosure provides an induction motor rotor shaft including a helical structure for guiding the flow of coolant through the induction motor rotor shaft to remove heat generated by the induction motor rotor. The helical structure pumps the oil axially down the induction motor rotor shaft as the induction motor rotor shaft rotates and improves cooling. Instead of requiring a separate coolant pump to transport the coolant through the induction motor rotor shaft, the coolant can be gravity fed, but in a manner that removes a sufficient amount of heat.

Figure 1:
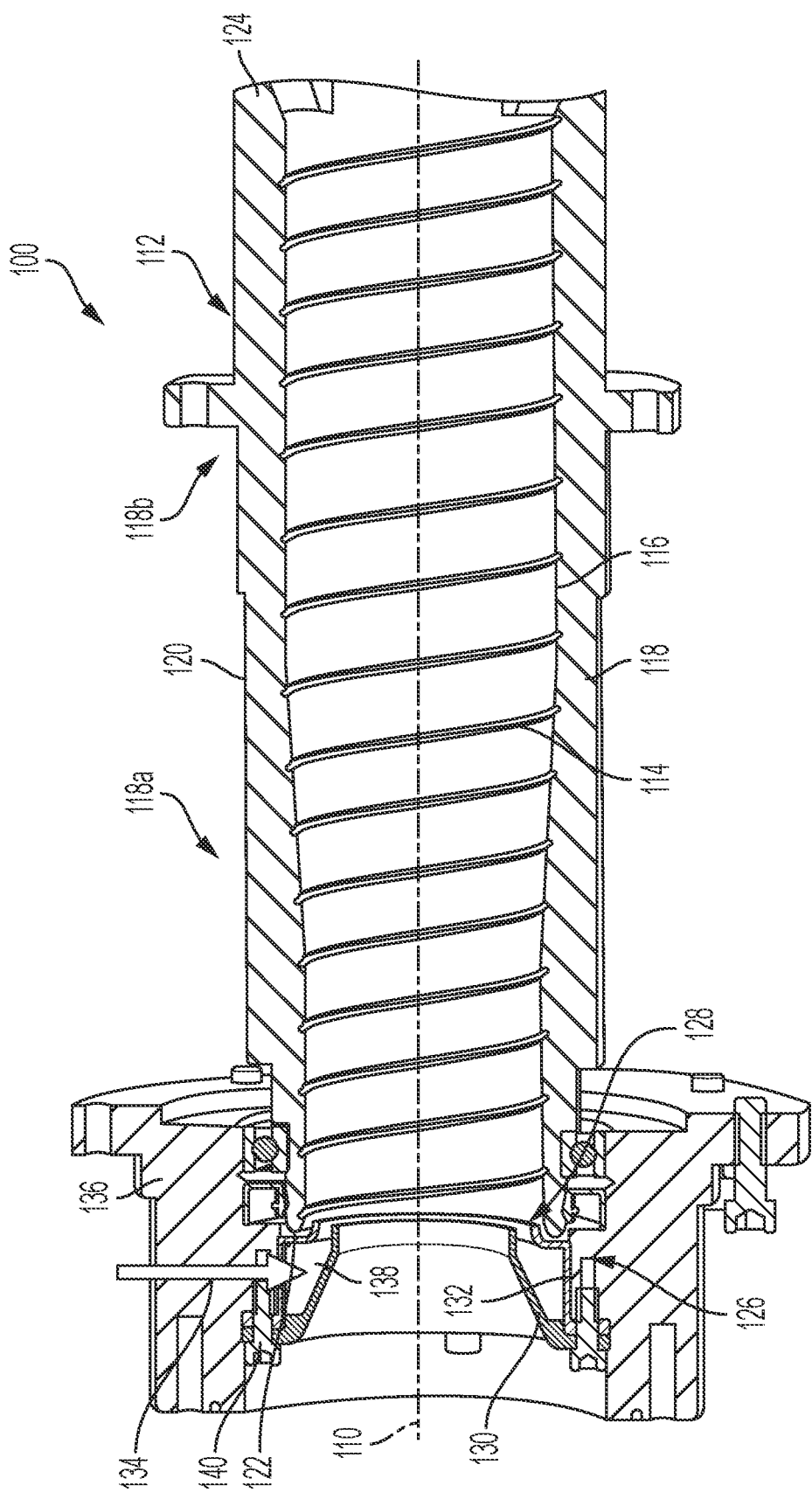
FIG. 1 shows a cross-sectional radially facing view of an induction motor rotor shaft in accordance with the present disclosure.

FIG. 1 shows a cross-sectional radially facing view of an induction motor rotor shaft assembly 100 in accordance with the present disclosure including an induction motor rotor shaft 112 including a helical structure 114 on or in an inner circumferential surface 116 of rotor shaft 112 and extending about a center axis 110 of rotor shaft 112. The terms axially, radially and circumferentially as used herein are used with respect to center axis 110.

Induction motor rotor shaft 112 includes a hollow cylindrical base 118 including inner circumferential surface 116, an outer circumferential surface 120, a first axial end annular surface 122 extending radially from the inner circumferential surface 116 to the outer circumferential surface 120, and a second axial end annular surface 124 extending radially from the inner circumferential surface 116 to the outer circumferential surface 120.

Induction motor rotor shaft assembly 100 further includes a coolant supply 126 for providing coolant inside of the hollow cylindrical base 118 onto the helical structure 114 for flow axially inside the hollow cylindrical base 118 along the helical structure 114 as the induction motor rotor shaft 112 rotates about the center axis 110.

Coolant supply 126 includes an outlet 128 having an annular shape to direct coolant into the hollow interior of hollow cylindrical base 118. Coolant supply 126 includes a radially inner baffle 130 and a radially outer baffle 132 between which coolant flows radially inward from a coolant inlet channel 134 passing through a support 136, in which the first axial end of induction motor rotor shaft 112 is rotatably mounted. Radially outer baffle 132 includes at least one radially extending opening therein through which coolant flows from coolant inlet channel 134 into an annular chamber 138 formed radially between baffles 130, 132. Baffles 130, 132 are shaped to direct the coolant axially into the interior of hollow cylindrical base 118 after the coolant flows radially inward from coolant inlet channel 134.

Baffles 130, 132 are fixed to support 136 by fasteners 140 passing through radially outer ends of baffles 130, 132 and into support 136. Coolant can be fed into coolant inlet channel 134 and through chamber 138 by gravity or another pumping method, causing the coolant to enter into the interior of hollow cylindrical base 118 and flow along helical structure 114 as induction motor rotor shaft 112 rotates about center axis 110. The rotation of induction motor rotor shaft 112 about center axis 110 causes helical structure 114 to pump the coolant axially through induction motor rotor shaft 112 away from the first axial end and baffles 130, 132 toward the second axial end to cool induction motor rotor shaft 112 during operation and remove the heat generated by induction motor 200 and transferred to induction motor rotor shaft 112 via rotor 204.

The hollow cylindrical base 118 includes a first axial half 118a and a second axial half 118b and the coolant supply 126 extends through the first axial end annular surface 122 into the first axial half 118a. Outlet 128 of the coolant supply 126 directs coolant into the first axial half 118a.

In the assembly 100 shown in FIG. 1, the helical structure 114 is provided in the first axial half 118a and in the second axial half 118b. More specifically, the helical structure 114 extends along an entire length of the inner circumferential surface 116.

The rotor shaft 112 has a varying inner diameter such that inner circumferential surface 116 of first half 118a has a greater average inner diameter than inner circumferential surface 116 of second half 118b. The inner diameter of inner circumferential surface 116 is larger at the first axial end of rotor shaft 112, defined by the axial end of first half 118a, than at the second axial end of rotor shaft 112, defined by the axial end of second half 118b. More specifically, the inner diameter of inner circumferential surface 116 increases while extending from the first axial end of rotor shaft 112 to the second axial end of rotor shaft 112. Such an increase in the inner diameter can allow fluid to flow more effectively along helical structure 114 based on the rotation of rotor shaft 112 and the supply of fluid via coolant supply 126.

A method of manufacturing the induction motor rotor shaft assembly 100 can include providing induction motor rotor shaft 112 and then forming helical structure 114 extending about the center axis on or in the inner circumferential surface. The method can further include providing coolant supply 126 for providing coolant inside of the hollow cylindrical base 118 onto the helical structure 114 for flow axially inside the hollow cylindrical base 118 along the helical structure 114 as the induction motor rotor shaft rotates about the center axis 110.

The forming of the helical structure 114 can include machining a helical groove in the inner circumferential surface 116. The forming of the helical structure 114 can include machining a helical protrusion on the inner circumferential surface 116. The forming of the helical structure 114 can also include depositing a helical protrusion on the inner circumferential surface 116. The hollow cylindrical base 118 can include a metal shaft section defining the outer circumferential surface 120, and the forming of the helical structure 114 can include inserting an insert defining the helical structure 114 within the metal shaft section. The insert can be plastic.

Figure 2:
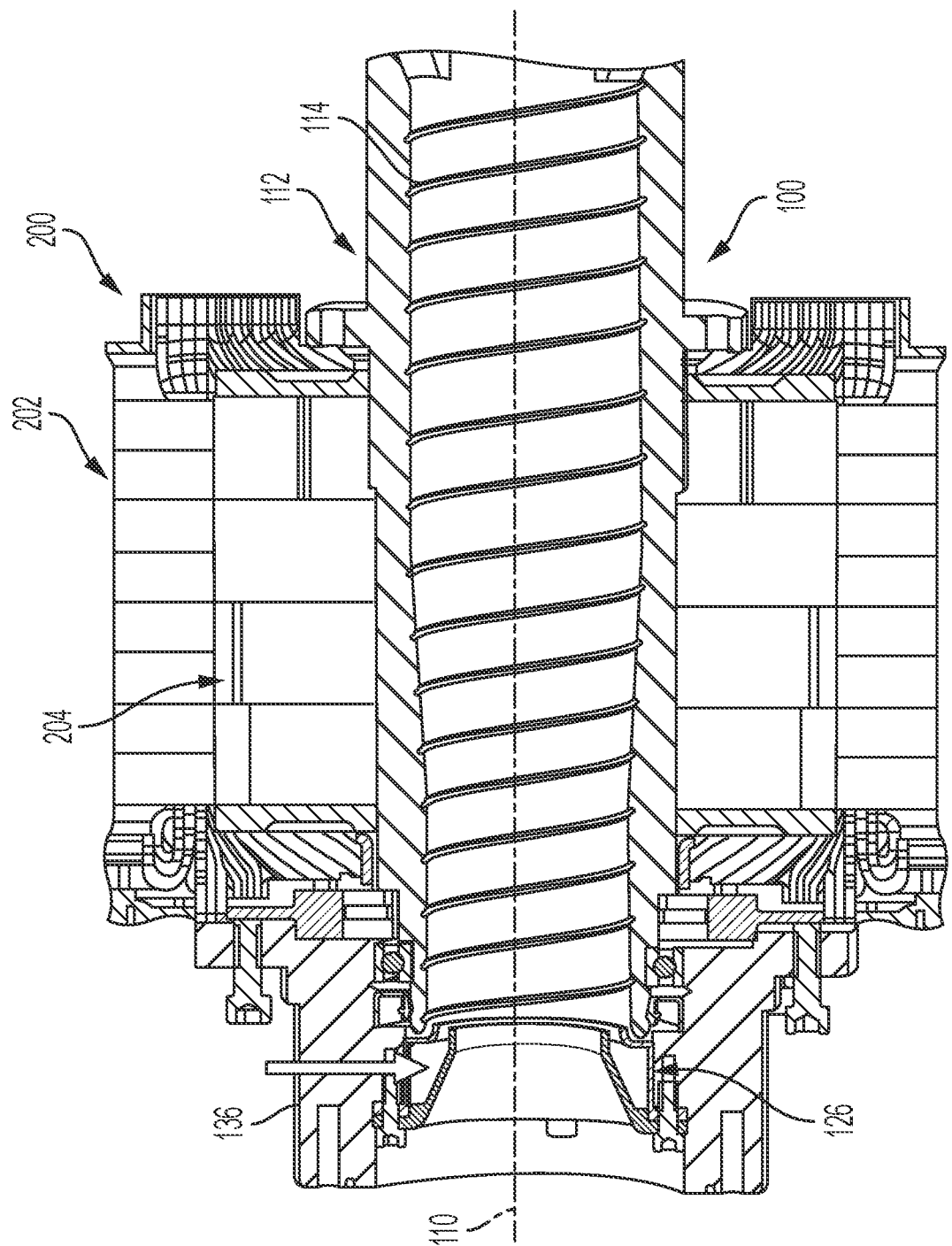
FIG. 2 shows a cross-sectional radially facing view of an induction motor including the shaft assembly.

FIG. 2 shows a cross-sectional radially facing view of an induction motor 200 including shaft assembly 100. Induction motor 200 includes a stator 202, a rotor 204 rotatable with respect to the stator 202 and the induction motor rotor shaft assembly 100. The rotor 204 is non-rotatably connected to the rotor shaft for rotating the rotor shaft 112 about the center axis 110. Upon current being provided to coils of stator 202, rotor 204 is rotated about center axis 110 in a known manner due to rotor 204 including a plurality of conductors that are energized by the current in the coils of stator 202, which causes induction motor rotor shaft 112 to also rotate about center axis 110. Support 136 is non-rotatably fixed to stator 202 and induction motor rotor shaft 112 and rotor 204 are rotatable together with respect to support 136 and stator 202 about center axis 110.

The rotation of induction motor rotor shaft 112 about center axis 110 causes helical structure 114 to pump the gravity fed coolant axially through induction motor rotor shaft 112 and away from coolant supply 126 to cool induction motor rotor shaft 112 during operation and remove the heat generated induction motor 200 and transferred to induction motor rotor shaft 112 via rotor 204.

Figure 3:
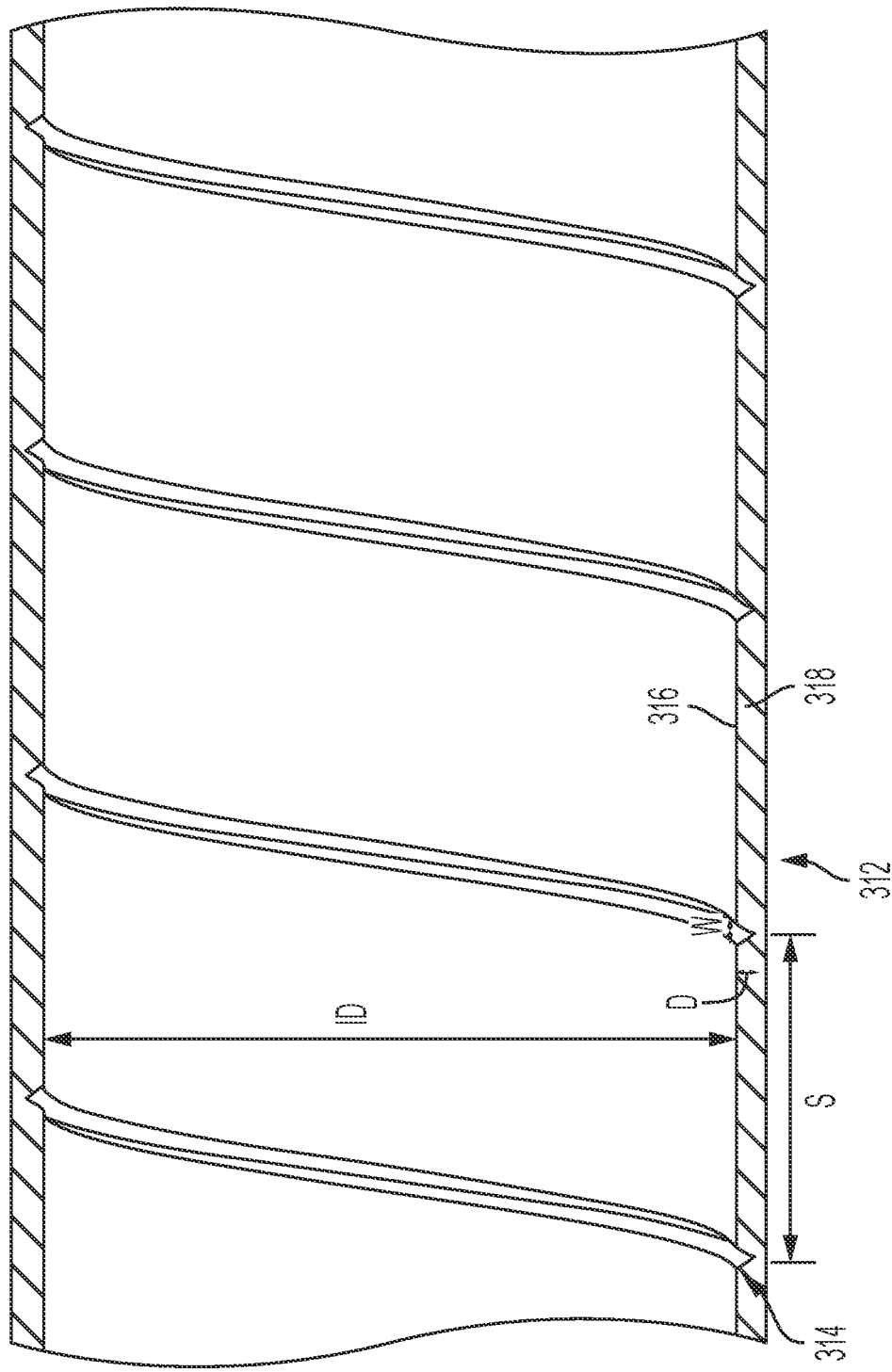
FIG. 3 schematically shows an induction motor rotor shaft wherein the helical structure is formed by a helical groove formed into an inner circumferential surface of a hollow cylindrical base.

FIG. 3 schematically shows an induction motor rotor shaft 312 wherein the helical structure is formed by a helical groove 314 formed into an inner circumferential surface 316 of a hollow cylindrical base 318. Groove 314 has an average depth D and an average width W, which is measured at inner circumferential surface 316. Hollow body 318 has an average inner diameter ID. Turn of groove 314 are separated by an average spacing S, as measured between the axial center of adjacent grooves 314.

An advantageous ratio between average inner diameter ID of hollow body 318 and average depth D of groove 314 is from 25:1 to 50:1. An advantageous ratio between average inner diameter ID of hollow body 318 and average width W of groove 314 is from 10:1 to 20:1. An advantageous ratio between average width W of groove 314 and average depth D of groove 314 is from 1.5:1 to 5:1. An advantageous ratio between average inner diameter ID of hollow body 318 and average spacing S of turns of groove 314 is 1.5:1 to 2.5:1.

Figure 4:
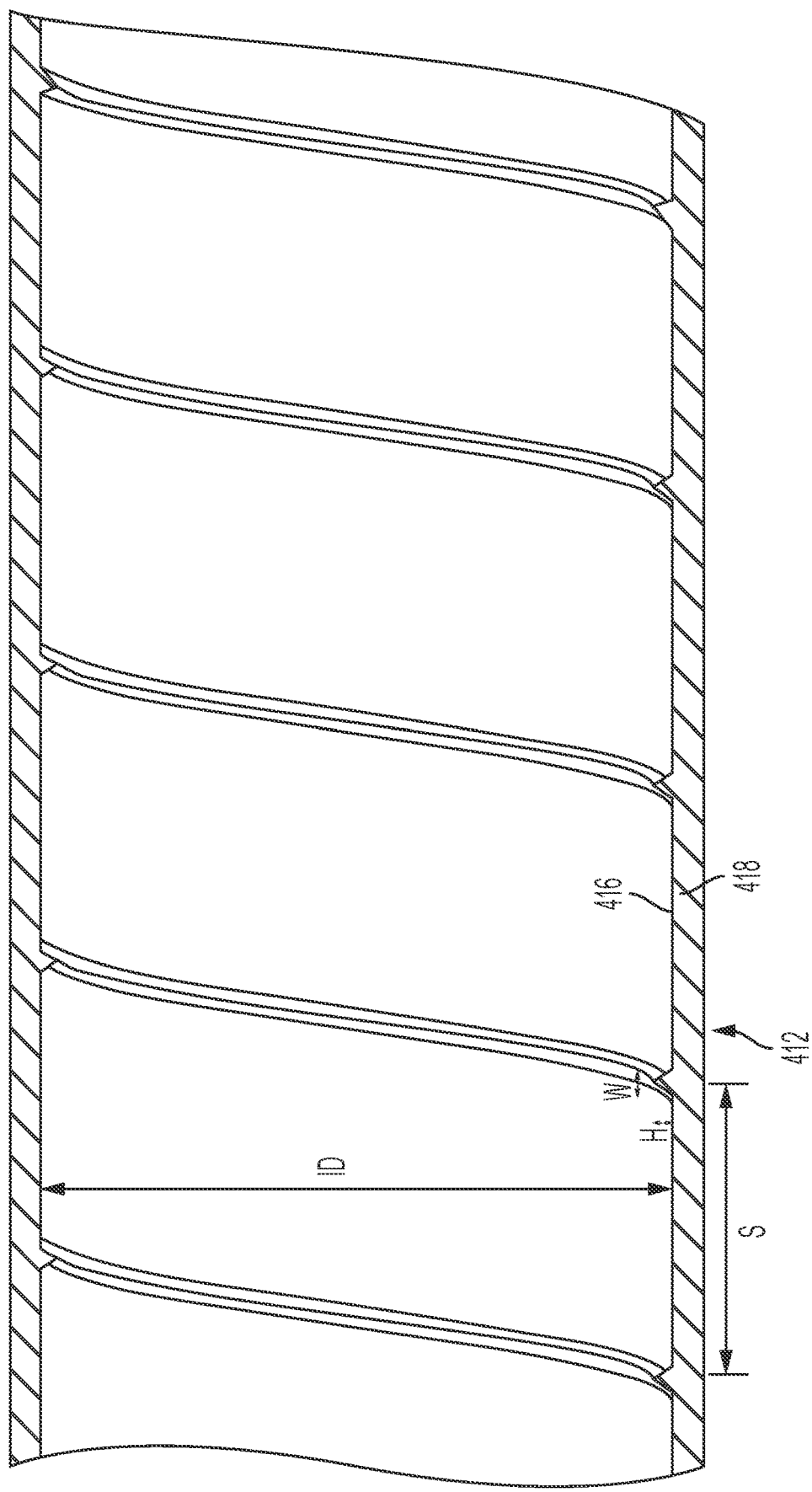
FIG. 4 schematically shows an induction motor rotor shaft wherein the helical structure is formed by a helical protrusion formed into an inner circumferential surface of a hollow cylindrical base.

FIG. 4 schematically shows an induction motor rotor shaft 412 wherein the helical structure is formed by a helical protrusion 414 formed into an inner circumferential surface 416 of a hollow cylindrical base 418. Protrusion 414 has an average height H and an average width W, which is measured at inner circumferential surface 416. Hollow body 418 has an average inner diameter ID. Turn of groove 414 are separated by an average spacing S. The advantageous ratios for induction motor rotor shaft 312 apply to induction motor rotor shaft 412, with the average depth D being replaced by average height H.

Figure 5:
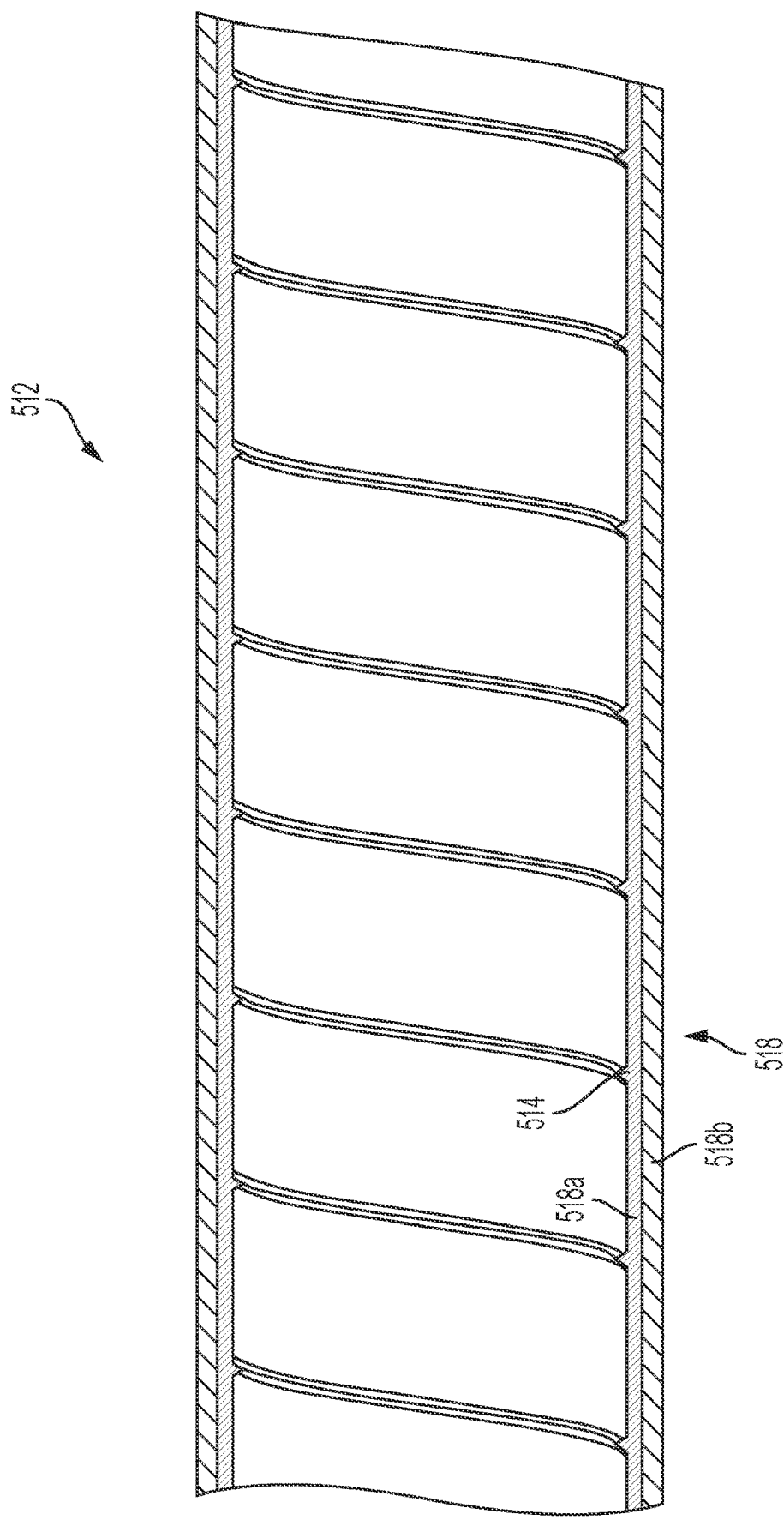
FIG. 5 schematically shows an induction motor rotor shaft wherein the helical structure is formed on an insert.

FIG. 5 schematically shows an induction motor rotor shaft 512 wherein the helical structure 514 is formed on an insert 518a. A hollow cylindrical base 518 of induction motor rotor shaft 512 includes a metal shaft section 518b defining the outer circumferential surface 518 and insert 518a defining the helical structure 514 within the metal shaft section 518b. The insert 518a can be plastic.

Figure 6:
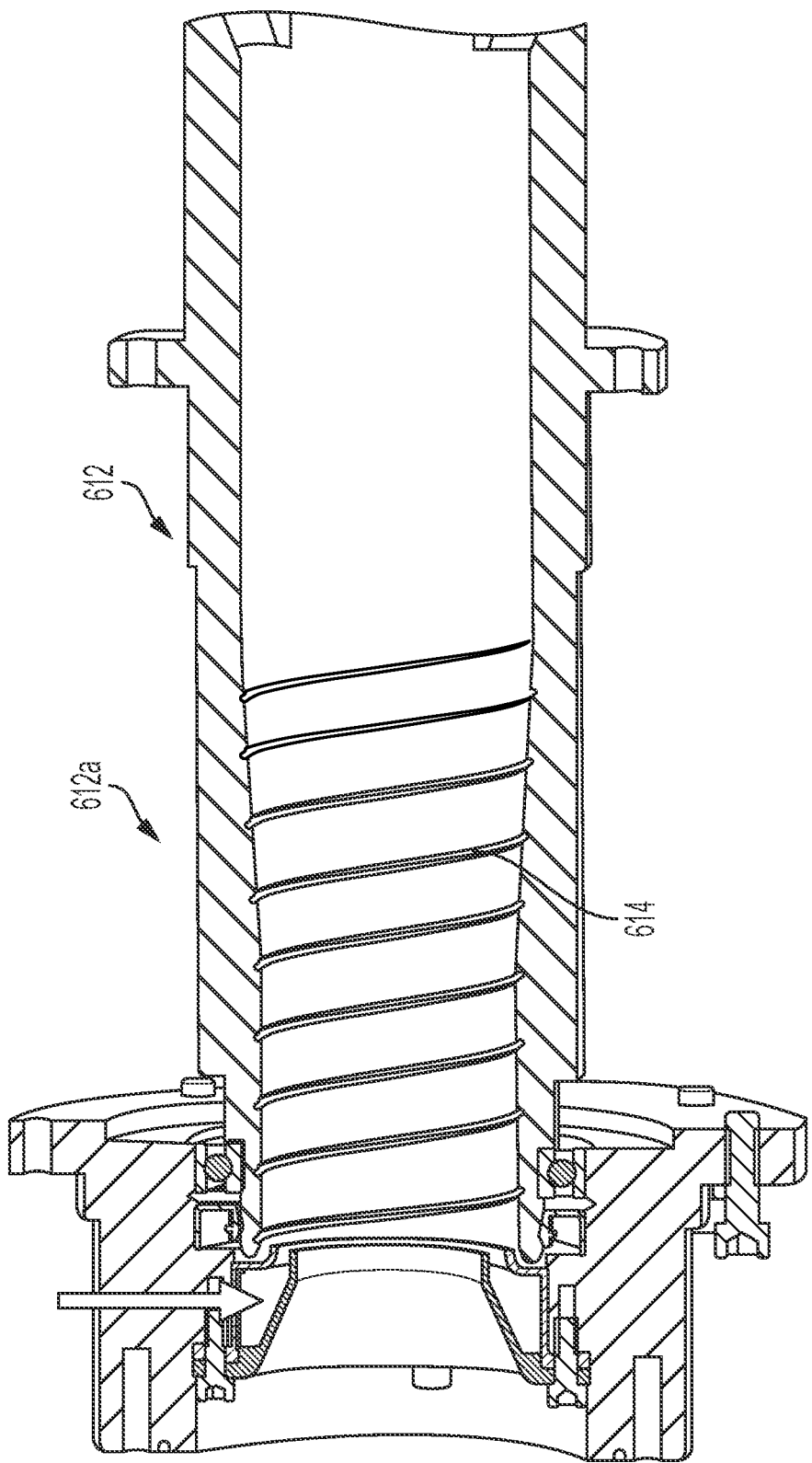
FIG. 6 shows a cross-sectional radially facing view of an induction motor rotor shaft in accordance with the present disclosure with the helical structure formed in only a first axial half of the shaft.

FIG. 6 shows a cross-sectional radially facing view of an induction motor rotor shaft 612 in accordance with the present disclosure with a helical structure 614 formed in only a first axial half 612a of induction motor rotor shaft 612.

REFERENCE NUMERALS 100 induction motor rotor shaft assembly
110 center axis
112 induction motor rotor shaft
114 helical structure
116 inner circumferential surface
118 hollow cylindrical base
118a first axial half
118b second axial half
120 outer circumferential surface
122 first axial end annular surface
124 second axial end annular surface
126 coolant supply
128 outlet
130 baffles
132 baffles
134 coolant inlet channel
136 support
138 annular chamber
140 fasteners
200 induction motor
202 stator
204 rotor
312 induction motor rotor shaft
314 groove
316 inner circumferential surface
318 hollow body
412 induction motor rotor shaft
414 helical protrusion
416 inner circumferential surface
418 hollow cylindrical base
512 induction motor rotor shaft
514 helical structure
518 hollow cylindrical base
518a insert
518b metal shaft section
612 induction motor rotor shaft
612a first axial half
614 helical structure

What is claimed is:

1. An induction motor rotor shaft assembly for an induction motor, the induction motor rotor shaft assembly comprising:

an induction motor rotor shaft rotatable about a center axis, the induction motor rotor shaft including a hollow cylindrical base including an outer circumferential surface, an inner circumferential surface, a first axial end and a second axial end, the induction motor rotor shaft including helical structure extending about the center axis on or in the inner circumferential surface; and a coolant supply for providing coolant inside of the hollow cylindrical base onto the helical structure for flow axially inside the hollow cylindrical base away from the first axial end and toward the second axial end along the helical structure as the induction motor rotor shaft rotates about the center axis.

2. The induction motor rotor shaft assembly as recited in claim 1, wherein the helical structure is formed by a helical groove in the inner circumferential surface.

3. The induction motor rotor shaft assembly as recited in claim 1, wherein the helical structure is formed by a helical protrusion on the inner circumferential surface.

4. The induction motor rotor shaft assembly as recited in claim 1, wherein the hollow cylindrical base includes a first axial half and a second axial half, the coolant supply providing coolant through the first axial end into the first axial half.

5. The induction motor rotor shaft assembly as recited in claim 4, wherein the helical structure is provided solely in the first axial half.

6. The induction motor rotor shaft assembly as recited in claim 4, wherein the helical structure is provided in the first axial half and in the second axial half.

7. The induction motor rotor shaft assembly as recited in claim 4, wherein the helical structure extends along an entire length of the inner circumferential surface.

8. The induction motor rotor shaft assembly as recited in claim 1, wherein the hollow cylindrical base includes a metal shaft section defining the outer circumferential surface and an insert defining the helical structure within the metal shaft section.

9. The induction motor rotor shaft assembly as recited in claim 8, wherein the insert is plastic.

10. The induction motor rotor shaft assembly as recited in claim 1, wherein the coolant supply includes an annular outlet through which coolant flows into the hollow cylindrical base.

11. The induction motor rotor shaft assembly as recited in claim 1, wherein an inner diameter of the inner circumferential surface increases while extending from the first axial end to the second axial end.

12. An induction motor comprising:
a stator;
a rotor rotatable with respect to the stator; and
the induction motor rotor shaft assembly as recited in claim 1, the rotor being non-rotatably connected to the rotor for rotating the induction motor rotor shaft about the center axis.

13. A method of operating the induction motor rotor shaft assembly as recited in claim 1, the method comprising:
feeding coolant through the coolant supply into the hollow cylindrical base and rotating the induction motor rotor shaft about the center axis to cause the helical structure to pump the coolant axially through the induction motor rotor shaft away from the coolant supply.

14. A method of manufacturing an induction motor rotor shaft assembly for an induction motor, the method comprising:
providing an induction motor rotor shaft rotatable about a center axis and including a hollow cylindrical base including an outer circumferential surface, an inner circumferential surface, a first axial end annular surface extending radially from the inner circumferential surface to the outer circumferential surface, and a second axial end annular surface extending radially from the inner circumferential surface to the outer circumferential surface forming a helical structure extending about the center axis on or in the inner circumferential surface; and providing a coolant supply for providing coolant inside of the hollow cylindrical base onto the helical structure for flow axially inside the hollow cylindrical base along the helical structure as the induction motor rotor shaft as the induction motor rotor shaft rotates about the center axis.

15. The method as recited in claim 14, wherein forming of the helical structure includes machining a helical groove in the inner circumferential surface.

16. The method as recited in claim 14, wherein forming of the helical structure includes machining a helical protrusion on the inner circumferential surface.

17. The method as recited in claim 14, wherein forming of the helical structure includes depositing a helical protrusion on the inner circumferential surface.

18. The method as recited in claim 14, wherein the hollow cylindrical base includes a first axial half and a second axial half, the coolant supply being provided through the first axial end annular surface into the first axial half, an outlet of the coolant supply being inside the first axial half.

19. The method as recited in claim 14, wherein the hollow cylindrical base includes a metal shaft section defining the outer circumferential surface, the forming of the helical structure including inserting an insert defining the helical structure within the metal shaft section.

* * * * *